United States Patent
Hougen

(10) Patent No.: US 7,486,802 B2
(45) Date of Patent: Feb. 3, 2009

(54) ADAPTIVE TEMPLATE OBJECT CLASSIFICATION SYSTEM WITH A TEMPLATE GENERATOR

(75) Inventor: Darrell Hougen, Littleton, CO (US)

(73) Assignee: Ford Global Technologies LLC, Dearborn, MI (US)

( * ) Notice: Subject to any disclaimer, the term of this patent is extended or adjusted under 35 U.S.C. 154(b) by 756 days.

(21) Appl. No.: 10/862,487

(22) Filed: Jun. 7, 2004

(65) Prior Publication Data
US 2005/0271254 A1    Dec. 8, 2005

(51) Int. Cl.
G06K 9/00        (2006.01)

(52) U.S. Cl. .................. 382/104; 382/217; 348/113; 348/169; 701/28; 701/223; 701/301

(58) Field of Classification Search .................. 382/104, 382/103, 105, 209, 217–225; 348/113–120, 348/169–172; 701/1, 28, 200, 207, 223, 701/301
See application file for complete search history.

(56) References Cited

U.S. PATENT DOCUMENTS 5,983,161 A * 11/1999 Lemelson et al. ............ 701/301
2003/0002713 A1 * 1/2003 Chen ........................... 382/104

* cited by examiner

Primary Examiner—Aaron W Carter
(74) Attorney, Agent, or Firm—Frank MacKenzie

(57) ABSTRACT

A method of performing object classification within a collision warning and countermeasure system (10) of a vehicle (12) includes the generation of an object detection signal in response to the detection of an object (52). An image detection signal is generated and includes an image representation of the object (52). The object detection signal is projected on an image plane (51) in response to the image detection signal to generate a fused image reference. A candidate template (55) is generated in response to the fused image reference. The candidate template (55) is validated. The object (52) is classified in response to the candidate template (55).

20 Claims, 3 Drawing Sheets

ADAPTIVE TEMPLATE OBJECT CLASSIFICATION SYSTEM WITH A TEMPLATE GENERATOR

TECHNICAL FIELD

The present invention generally relates to collision warning and countermeasure systems for an automotive vehicle. More particularly, the present invention relates to a system and method of generating object classification templates and adaptively modifying such templates.

BACKGROUND OF THE INVENTION

Collision warning and countermeasure systems are becoming more widely used. Collision warning systems are able to detect an object within proximity of a host vehicle and assess whether the object detected is an obstacle and poses a threat to the host vehicle. These systems also provide a vehicle operator with knowledge and awareness of obstacles or vehicles within close proximity in time so that the operator may perform actions to prevent colliding with the detected obstacles. Countermeasure systems exist in various passive and active forms. Some countermeasure systems are used in the prevention of a collision; other countermeasure systems are used in the prevention of an injury to a vehicle operator.

Collision warning systems may be forward or rearward sensing. These systems can indicate to a vehicle operator that an object, which may not be visible to the vehicle operator, is within a stated distance and location relative to the host vehicle. The vehicle operator may then respond accordingly. Other collision warning systems and countermeasure systems activate passive countermeasures such as air bags, load-limiting seat belts, or active vehicle controls including steering control, accelerator control, and brake control whereby the system itself aids in the prevention of a collision or injury.

A detected object of concern may be a real object or a false object. False objects may be detected, for example, when there is a stationary roadside object that is foreseen as a true potentially collision-causing object. A false object may also be detected when a small object, which is not a potential threat, is in the path of the host vehicle and is identified and misclassified as a potentially collision-causing object. Another example situation of when a false object may be generated is when a ghost object is generated, which corresponds with an object that actually does not exist.

The collision warning and countermeasure systems collect data from multiple sensors and associate, fuse, or combine the data to determine whether detected objects are real objects rather than false objects. Advantages of utilizing data from multiple sensors includes extended spatial and temporal coverage, increased accuracy in determining whether an object is a potential threat, and increased reliability in the detection of objects in close proximity of the host vehicle. The stated advantages provide a better assessment of the surroundings of the host vehicle.

There is a current interest in using vision detection sensors, such as cameras, in the detection and classification of objects. Unfortunately, current camera technology requires a large amount of processing power and time to compute relevant information required for in-vehicle use. For example, image processing from a charge coupled device (CCD) camera is time consuming due to the large amount of data collected for each image, approximately 640×480 pixels per frame at 30 frames per second. To accurately classify and track an object can require the acquisition of tens to hundreds of frames of data with each frame having a minimum desired resolution.

Also, template matching is a common technique that has been used in the classification of an object. Template matching typically compares an image region with a set of stored templates for the purpose of determining the identity of an object. Typically, a set of templates is created offline from a set of images of known objects of interest. However, template matching is effective when the set of objects to be recognized is known in advance. Furthermore, it is not practical to generate a complete set of templates for all objects in advance of a potential collision situation, due to the large number of possible combinations of vehicle models, colors, accessories, and payloads. It is further not practical to consider each pixel within an image plane, due to the large computation and time requirements associated therewith.

A desire exists to provide a safer automotive vehicle with increased collision warning and safety countermeasure intelligence to decrease the probability of a collision or of an injury. It is also desireable for a collision warning and countermeasure system to be time efficient and cost effective. Thus, there exists a need for an improved cost effective collision warning and safety countermeasure system that utilizes time and system resource efficient object detection and classification techniques.

SUMMARY OF THE INVENTION

The present invention provides a system and method of detecting and classifying objects within close proximity of an automotive vehicle. The method includes the generation of an object detection signal in response to the detection of an object. An image detection signal is generated and includes an image representation of the object. The object detection signal is projected on an image plane in response to the image detection signal to generate a fused image reference. A candidate template is generated in response to the fused image reference. The candidate template is validated. The object is classified in response to the candidate template.

The embodiments of the present invention provide several advantages. One such advantage is the provision of a collision warning and countermeasure system that minimizes image processing time, processor requirements, memory requirements, and system complexity, thus providing a cost effective and feasible solution for in-vehicle use of existing camera technology.

Another advantage provided by an embodiment of the present invention is the provision of a method of associating data collected from both electro-magnetic and electro-optical sensors, such as radar sensors and cameras, so as to better and more efficiently classify and track objects.

Yet another advantage provided by an embodiment of the present invention is the provision of a collision warning and countermeasure system that is capable of generating object templates and also adjusting and updating a current set of object templates. The stated embodiment provides increased object classification accuracy and efficiency.

The present invention itself, together with attendant advantages, will be best understood by reference to the following detailed description, when taken in conjunction with the accompanying drawing figures.

BRIEF DESCRIPTION OF THE DRAWINGS

For a more complete understanding of the invention, reference should be made to the embodiments illustrated in greater detail in the accompanying drawing figures, and also described below by way of examples of the invention, wherein.

DETAILED DESCRIPTION

Figure 1:
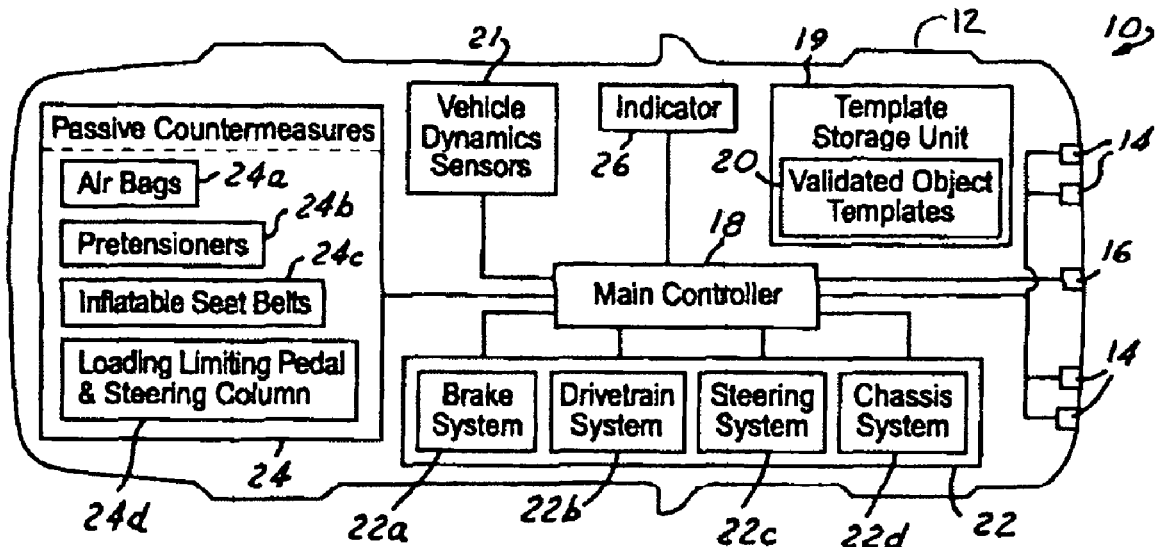
FIG. 1 is a block diagrammatic view of a collision warning and countermeasure system for an automotive vehicle in accordance with an embodiment of the present invention.

In FIGS. 1-4 discussed as follows, the same reference numerals will generally be used to refer to the same components. While the present invention is described with respect to a system and method of generating object classification templates and adaptively performing modification thereof, the present invention may be adapted and applied to various systems including: collision warning systems, collision avoidance systems, parking aid systems, reversing aid systems, countermeasure systems, vehicle systems, or other systems that may require collision avoidance or assessment.

In the following description, various operating parameters and components are described for one constructed embodiment. These specific parameters and components are included as examples and are not meant to be limiting.

Also, in the following description, the term "performing" may include activating, deploying, initiating, powering, and other terms known in the art that may describe the manner in which a passive countermeasure may be operated.

Additionally, in the following description, the term "countermeasure" may refer to reversible or irreversible countermeasures. Reversible countermeasures refer to countermeasures that may be reset to their original form or used repeatedly without a significant amount of functional deficiency, which may be determined by a system designer. Irreversible countermeasures refer to countermeasures such as airbags that, once deployed, are not reusable.

Referring now to FIG. 1, a block diagrammatic view of a collision warning and countermeasure system 10 for an automotive vehicle or host vehicle 12 in accordance with an embodiment of the present invention is shown. The system 10 includes electromagnetic or non-vision sensors 14 and one or more electro-optical or image-generating sensors 16 (only one is shown), which are electrically coupled to a main controller 18. The controller 18 combines information received from the electromagnetic sensors 14 and the electro-optical sensors 16 to detect and associate objects from multiple sensors for the purpose of object tracking and threat assessment within close proximity of the vehicle 12. The system 10 also includes a template storage unit 19 coupled to the controller 18 and storing multiple validated object templates 20 for the classification of detected objects.

The system 10 may also include various vehicle dynamic sensors 21, active countermeasures 22, passive countermeasures 24, and an indicator 26, which are all electrically coupled to the controller 18. The main controller 18 may activate the countermeasures 22 and 24 or indicate to a vehicle operator various object and vehicle information, via the indicator 26, to prevent a vehicle collision and injury to vehicle occupants.

In determining sensors that are appropriate for a given application, factors such as range, range rate, shape, and size of an object are considered. In an embodiment of the present invention, active sensors in the form of radar are used for non-vision sensors 14 and passive sensors in the form of cameras are used for the image-generating sensors 16 to access surroundings of the vehicle 12. Radar provides derived measurements such as range, range rate, azimuth angle, elevation, and approximate size of an object, as well as other information known in the art. Through the use of cameras' measurements, the location, size, and shape of an object can be derived.

The non-vision sensors 14 may be of various sensor technologies including radar, lidar, or other sensor technology forms known in the art and may be referred to as active sensors. The non-vision sensors 14 generate multiple object detection signals, which may contain radar cross-section (RCS), frequency, and time information, upon detection of one or more objects of various size and shape. Although four non-vision sensors are shown, any number of non-vision sensors may be utilized. In the present invention, the object detection signals are utilized to compute derived measurements such as object relative range, azimuth angle, velocity, and bearing information, as well as other object information known in the art.

The image-generating sensors 16 may be in the form of charge-coupled devices (CCDs) or of another type, such as a camera using complementary metal-oxide semiconductor (CMOS) technology. The image-generating sensors 16 may be referred to as passive sensors. The image-generating sensors 16 are two-dimensional devices that may have varying resolution, accuracy, field-of-view (FOV), and silicon wafer capability. Any number of image-generating sensors 16 may be used.

The main controller 18 may be microprocessor based such as a computer having a central processing unit, memory (RAM and/or ROM), and associated input and output buses. The main controller 18 may be a portion of a central vehicle main control unit, an interactive vehicle dynamics module, a restraints control module, a main safety controller, or may be a stand-alone controller as shown.

The template storage unit 19 may be in various forms. The storage unit 19 may be in the form of RAM/ROM, a disk drive, a stand-alone memory device, or other storage unit known in the art. The template storage unit 19 stores the templates 20 for quick access by the controller 18. Any number of templates may be stored in the storage unit 19. The templates 20 may include templates for automotive vehicles, trucks, sport utility vehicles (SUVs), trailers, motorcycles, pedestrians, guardrails, road signs, inanimate living objects such as bushes and trees, as well as other objects known in the art. The templates 20 may also include sizes, shapes, and colors and may have corresponding adjustments for object relative range and range rate.

Each object template 20 is stored with an associated confidence score value. The confidence score value may include a frequency occurrence level, referring to the number of instances when a similar object has been identified and the date of identification. The confidence score value may also include pixel intensity values, contrasts between windows, variations or differences between a current image and a validated template, or other similar template scoring parameters known in the art.

The vehicle dynamics sensors 21 may include a transmission rotation sensor, a wheel speed sensor, an accelerometer, an optical sensor, or other velocity or acceleration sensor known in the art. The vehicle dynamics sensors 21 are used to determine the velocity and acceleration of the vehicle 12 and to generate a vehicle dynamics signal.

Active countermeasures 22 may include control of a brake system 22a, a drivetrain system 22b, a steering system 22c, and/or a chassis system 22*d*, and may include other active countermeasures known in the art.

The passive countermeasures 24 may include passive countermeasures such as air bags 24*a*, pretensioners 24*b*, inflatable seat belts 24*c*, load-limiting pedals and steering columns 24*d*, and other passive countermeasures and control thereof as known in the art. Some other possible passive countermeasures that may be included, but that are not shown, are seatbelt control, knee bolster control, head restraint control, load-limiting pedal control, load-limiting steering control, pretensioner control, external airbag control, and pedestrian protection control. Pretensioner control may include control over pyrotechnic and motorized seatbelt pretensioners. Airbag control may include control over front, side, curtain, hood, dash, or other type of airbag. Pedestrian protection control may include the control of a deployable vehicle hood, a bumper system, or other pedestrian protective device.

Indicator 26 is used to signal or indicate a collision-warning signal or an object identification signal in response to the object detection signals. The indicator 26 may include a video system, an audio system, a light-emitting diode (LED), a light, a global positioning system (GPS), a heads-up display, a headlight, a taillight, a display system, a telematic system, or other indicator. The indicator 26 may supply warning signals, which may include external-warning signals to objects or pedestrians located outside of the vehicle 12, or other pre and post collision-related information.

Figure 2:
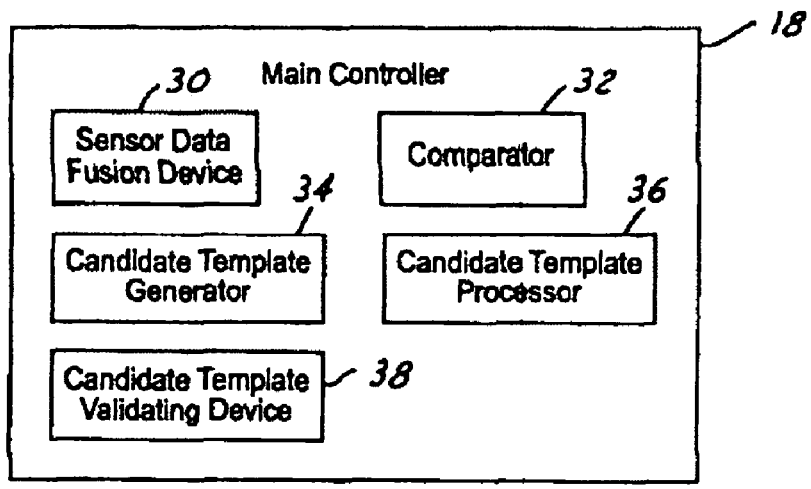
FIG. 2 is a block diagrammatic view of a sample architecture of a controller of the system of FIG. 1 in accordance with an embodiment of the present invention.

Referring now to FIG. 2, a block diagrammatic view of a sample architecture of the controller 18 in accordance with an embodiment of the present invention is shown. The controller 18 includes a sensor data fusion device 30, a comparator 32, a candidate template generator 34, a candidate template processor 36, and a candidate template-validating device 38. The fusion device 30 is used for the integration of signals generated by the sensors 14 and 16. The comparator 32 is used in comparing a fused image reference with stored object templates. The template generator 34 is used to generate a custom candidate object template. The template processor 36 is used in adjusting a fused image reference location of a candidate template and in refining the fused image reference location. The validating device 38 determines whether the candidate template is one that warrants validation and storage thereof for future use. The above-stated devices of the controller 18 and their associated functions are described in further detail below with respect to the embodiments of FIGS. 3 and 4. The above-stated devices of the controller 18 may be in the form of software modules or may be hardware based and/or separated from the controller 18.

Figure 3:
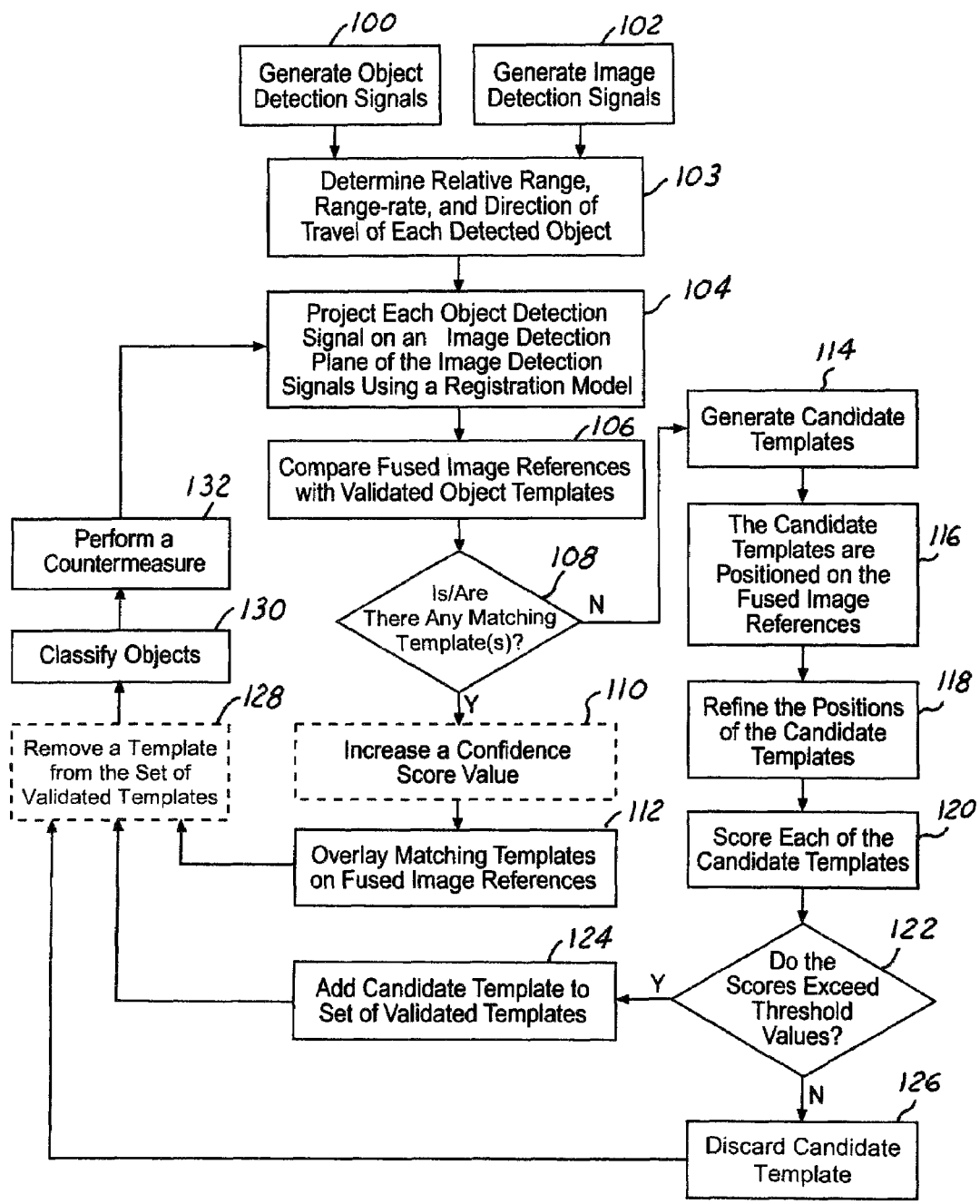
FIG. 3 is a logic flow diagram illustrating a method of performing object classification and collision avoidance in accordance with an embodiment of the present invention.
Figure 4:
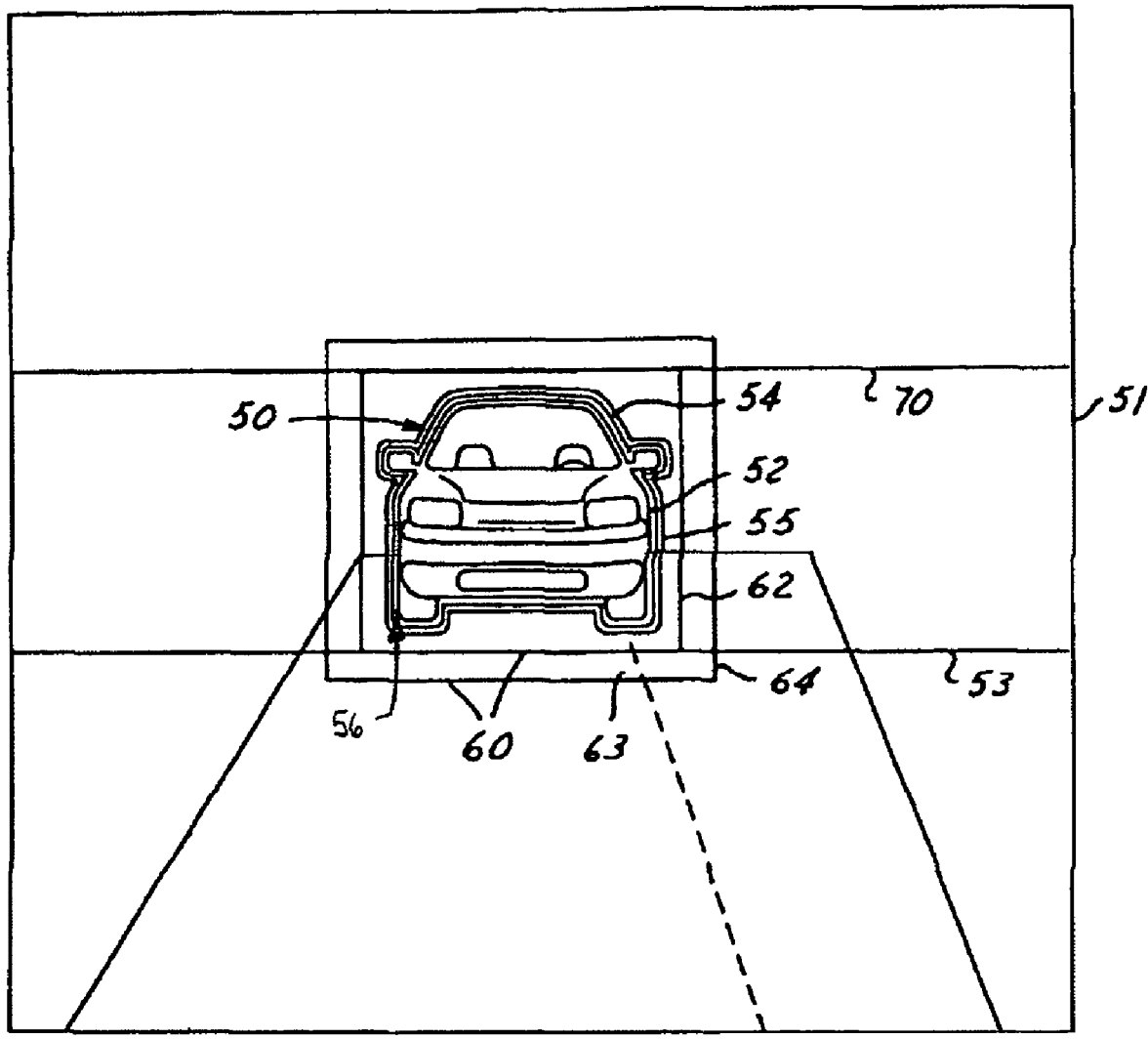
FIG. 4 is an illustrative sample of a fused image reference in accordance with an embodiment of the present invention.

Referring now to FIGS. 3 and 4, a logic flow diagram illustrating a method of performing object classification and collision avoidance and a sample fused image reference 50 of an image or image detection plane 51 in accordance with an embodiment of the present invention is shown.

In step 100, the non-vision sensors 14 generate one or more object detection signals in response to detected objects, such as the object 52. The non-vision sensors 14 may perform upramp and downramp sweeps to generate object designators that correspond to the detected objects. The object designators are obtained by comparing a received echo signal with an originally transmitted signal to determine ranges and azimuth angles of the objects. Data received from the non-vision sensors 14 is used to determine initial locations of templates within the image 51 and the locations at which successive matches are attempted. The use of the non-vision sensors 14 significantly reduces the computational burden and provides a source of information that can be used in object verification.

In step 102, the image-generating sensors 16 generate image detection signals. Steps 100 and 102 may be performed simultaneously.

In step 103, range, range-rate, and direction of travel are determined for each object of concern relative to the host vehicle 12. The range determined is used to heuristically determine the size of the object 52. The range rate or relative velocity of the object 52 may be determined in response to the Doppler shift between signals as known in the art.

In step 104, the fusion device 30 projects each object detection signal on an image detection plane, associated with the image detection signals, to generate fused image references, such as the fused image reference 50. This projection is performed using a registration model. The registration model may include relative positions of the sensors 14 and 16 in relation to each other and to ground or a ground plane 53.

In step 106, the comparator 32 compares the fused image references with templates 20. The comparator 32 attempts to select a template that closely matches the fused image references of interest. The comparator 32 generates match levels corresponding to the difference between the fused image references and the approximately matching templates.

In step 108, the controller 18 compares the match levels with a first predetermined value. When the match levels are greater than the predetermined value, the controller 18 proceeds to step 110; otherwise, the controller 18 proceeds to step 114.

In step 110, the controller 18 may increase a confidence score value corresponding with each of the matching templates. The confidence score value, as stated above, may include a frequency occurrence level and other comparative factors, such as pixel intensity values, and pixel contrasts between object windows. For example, when an object is detected having a matching template stored within the storage unit 19, the frequency occurrence value for that template may be incremented, which in turn increases the confidence score value. As another example, when the pixel intensity values for the detected object are above a predetermined pixel threshold value, the confidence score value may also be increased.

In step 112, the controller 18 creates templates on or in essence overlays the matching templates, selected from the templates 20, on the fused image references. The image position of the matching templates is determined in response to the registration model and the object range and range rate. Upon completion of step 112, the controller 18 proceeds to step 128.

In step 114, when a match level is less than the first predetermined value, the template generator 34 generates a candidate template, such as candidate template 55, in response to the fused image reference 50. The candidate template may have the size and shape of the outer periphery of the object of concern, as illustrated by outer periphery 56 of the object 52 in FIG. 4.

In step 116, the candidate template 55 is positioned on the fused image reference 50, similar to the positioning of the matching template 54 of step 112. The candidate template 55 is positioned or oriented at an unused fused image location within the fused image reference 50. The unused fused image location refers to a location within the fused image reference 50 where another "radar hit" or another object has already been identified. A radar hit refers to one or more points within the fused image reference 50 that are associated with the detected object 52 and have been projected from the object detection signals.

In step 118, the template processor 36 refines the position of the candidate template using heuristics. The candidate templates are retained when their presence is verified over several frames, at which non-vision sensor data is provided at each frame. In refining the position of a candidate template, the processor 36 may use double window operations. Double window operations refer to the use of a pair of windows, such as windows 60, surrounding an object of interest. The pair of windows 60 includes an inner window 62 and an outer window 64. The inner window 62 closely matches the peripheral size of an object of interest, whereas the outer window 64 is larger than and surrounds the inner window 62. The candidate template is positioned within the inner window 62.

The template processor 36 continuously compares pixel intensities or contrasts between pixels in the inner window 62 and pixels in a band 63, which refers to pixels exterior to the inner window 62 and internal to the outer window 64. The template processor 36 may evaluate pixel intensities within the inner window 62 to generate an inner window pixel value and evaluate pixel intensities within the band 63 to generate an outer window pixel value. The inner window pixel value is compared with the outer window pixel value and in response thereto, the position of the candidate template is adjusted within the fused image reference 50.

The template processor 36 decreases the size and adjusts the position of the windows 62 and 64 until the object is approximately centered therein and the sizes of the windows 62 and 64 are minimized. Since it is not practical to form templates centered on all pixels within the fused image reference and for various object ranges, due to the computational burden thereof, window minimization aids in reducing the number of generated templates. This also minimizes image-processing time by focusing image processing to particular portions of the initial fused image reference 50 and of the image 51. The positions of the windows 62 and 64 may be centered upon a pixel or group of pixels within the windows 62 and 64 that have the greatest pixel intensity.

In decreasing the size of the windows 62 and 64, the template processor 36 may initially and effectively clip the windows 62 and 64 at the ground plane 53 and at the horizon plane 70, thereby quickly discarding or removing a large portion of the image 51. The ground plane 53 and the horizon plane 70 may be determined by the range and range rate of the object, as well as by the size of the object.

Features of subregions of the windows 62 and 64 may be monitored or evaluated to provide additional statistics for the acceptability of the fused image reference 50.

In step 120, the validating device 38 scores the resultant candidate template. The validating device 38 may score the resultant candidate template using double window operations. In so doing, the validating device 38 may generate a confidence score value corresponding to the average pixel intensity values within the inner window 62 as compared to average pixel intensity values in the band 63. The score value may also be based on frequency occurrence levels, pixel intensity values, contrasts between windows, variations or differences between the candidate template 55 and a validated template 54, or other similar template scoring parameters known in the art. The initial score value of a newly generated template generally is a low value.

In step 122, the controller 18 determines whether the score value is greater than or equal to a second predetermined value. When the score value is greater than or equal to the second predetermined value, the controller 18 proceeds to step 124; otherwise, the controller 18 discards the candidate template 55, as shown by step 126.

In step 124, the controller 18 validates and adds the resulting candidate template to the set of stored templates 20. The newly generated and stored template may then be used in the future to classify detected objects. Upon completion of steps 124 and 126, the controller 18 generally returns to executing step 104.

In step 128, the controller 18 may periodically review the confidence score value including the frequency occurrence values of each of the stored templates 20 and remove a template when the associated values are less than associated predetermined threshold values. It is not effective or feasible to maintain a long list of irrelevant templates; thus, by periodically removing such templates, a limited number of relevant templates is thereby maintained.

In step 130, the controller 18 may classify the detected objects in response to the validated templates 20. The validated templates 20 may have been initially stored in the storage unit 19 or may have been generated upon detection of objects during operation of the system 10. The classification includes determining whether an object is a vehicle or a non-vehicle. Double window operations may be used in determining whether an object is a vehicle. In step 132, upon classification of the objects, the controller 18 may then perform one or more of the countermeasures 22 or 24 or warn a vehicle operator via the indicator 26.

The above-described steps are meant to be an illustrative example; the steps may be performed sequentially, synchronously, simultaneously, or in a different order depending upon the application.

The present invention provides a collision warning and countermeasure system that utilizes non-vision sensors in conjunction with image-generating sensors to minimize and simplify image processing and more efficiently classify and track objects. The multiple sensor data fusion architecture of the present invention reduces the amount of image processing by processing only selected areas of an image frame as determined in response to information from the sensors. The countermeasure system is capable of generating and evaluating candidate templates upon detection of an unidentifiable object. In so doing, the system maintains an accurate object profile set for accurate and efficient object evaluation.

While the invention has been described in connection with one or more embodiments, it is to be understood that the specific mechanisms and techniques that have been described herein are merely illustrative of the principles of the invention, and that numerous modifications may be made to the methods and apparatus described herein without departing from the spirit and scope of the invention as defined by the appended claims.

What is claimed is:

1. A method of performing object classification in a collision warning and countermeasure system of a vehicle, said method comprising the steps of:

detecting at least one object and generating at least one object detection signal in response to the detection;

generating at least one image detection signal including an image representation of said at least one object;

projecting said at least one object detection signal on an image plane in response to said at least one image detection signal to thereby generate at least one fused image reference;

comparing at least one said fused image reference to at least one validated object template that has been selected from a stored plurality of validated object templates;

if at least one said validated object template is determined to sufficiently match at least one said fused image reference, classifying at least one said object according to the at least one matching validated object template; and if no said validated object template is determined to sufficiently match at least one said fused image reference, generating at least one candidate object template according to at least one said fused image reference, validating at least one said candidate object template, and classifying at least one said object according to at least one validated candidate object template.

2. A method as in claim 1, said method comprising the steps of:
comparing said at least one fused image reference with said plurality of validated object templates to thereby select an approximately matching object template;
determining a match level between at least one said fused image reference and said matching object template; and
adjusting a score level of said matching object template in response to at least one said fused image reference.

3. A method as in claim 1, said method comprising the steps of:
detecting a first object and generating a first object detection signal;
generating a first candidate object template in response to said first object detection signal;
detecting a second object and generating a second object detection signal; and
classifying said second object in response to said first candidate object template.

4. A method as in claim 1, said method further comprising the step of refining an image location of at least one said candidate object template.

5. A method as in claim 4, wherein refining said image location comprises performing double window operations.

6. A method of performing object classification in a collision warning and countermeasure system of a vehicle, said method comprising the steps of:
detecting at least one object and generating at least one object detection signal in response to the detection;
generating at least one image detection signal comprising an image representation of said at least one object;
projecting said at least one object detection signal on an image plane in response to said at least one image detection signal to generate at least one fused image reference;
generating at least one candidate template in response to said at least one fused image reference;
validating said at least one candidate template;
classifying at least one of said at least one object in response to said at least one candidate template; and
refining an image location of said at least one candidate template;
wherein refining said image location comprises performing double window operations; and
wherein performing said double window operations comprises:
generating an inner window corresponding to the size and shape of said at least one object;
generating an outer window larger than and surrounding said inner window;
evaluating pixel intensities within said inner window to generate an inner window pixel value;
evaluating pixel intensities within said outer window to generate an outer window pixel value;
comparing said inner window pixel value with said outer window pixel value; and
adjusting the image location of said at least one candidate template in response to the comparison.

7. A method as in claim 1, said method further comprising the step of scoring at least one said candidate object template, and said scoring comprising at least one of:
determining a frequency occurrence level;
comparing pixel intensity values;
comparing pixel contrasts between windows; and
comparing a candidate object template with a validated object template.

8. An object classification system for a collision warning and countermeasure system of a vehicle, said object classification system comprising:
at least one non-vision object detection sensor operable to detect at least one object and generate at least one object detection signal in response to the detection;
at least one image-generating sensor operable to generate at least one image detection signal including an image representation of said at least one object;
a fusion device operable to project said at least one object detection signal on an image plane in response to said at least one image detection signal to thereby generate at least one fused image reference;
a template storage device operable to store a plurality of validated object templates;
a comparator operable to compare at least one said fused image reference to at least one validated object template that has been selected from said plurality of validated object templates;
a template generator operable to generate at least one candidate object template according to at least one said fused image reference if no said validated object template is determined to sufficiently match at least one said fused image reference;
a template validating device operable to validate at least one said candidate object template; and
a controller operable to classify at least one said object according to at least one matching validated object template or at least one validated candidate object template.

9. An object classification system as in claim 8, wherein said fusion device is operable to project said at least one object detection signal according to a registration model.

10. An object classification system as in claim 9, wherein said registration model includes relative positions of said at least one non-vision object detection sensor, said at least one image-generating sensor, and ground.

11. An object classification system as in claim 9, wherein said template storage device is operable to also store a plurality of validated candidate object templates.

12. An object classification system as in claim 11, wherein said plurality of validated object templates are stored with an associated frequency occurrence level.

13. An object classification system as in claim 11, wherein said controller is operable to periodically remove a validated object template from said template storage device when an associated frequency occurrence level is below a predetermined value.

14. An object classification system as in claim 8, wherein said comparator is operable to compare at least one said fused image reference with said plurality of validated object templates to thereby select an approximately matching object template.

15. An object classification system as in claim 14, wherein said controller is operable to increase the frequency occurrence level of said matching object template when a match level is greater than a predetermined level.

16. An object classification system as in claim 8, wherein said system further comprises a candidate template processor operable to orient at least one said candidate object template at an unused fused image location within at least one said fused image reference.

17. An object classification system as in claim 8, wherein said system further comprises a candidate template processor operable to refine an image location of at least one said candidate object template.

18. An object classification system as in claim 17, wherein said candidate template processor is operable to use double window operations in refining an image location.

19. A method of operating a collision warning and countermeasure system of a vehicle, said method comprising the steps of:
   detecting at least one object and generating at least one object detection signal in response to the detection;
   generating at least one image detection signal including an image representation of said at least one object;
   projecting said at least one object detection signal on an image plane in response to said at least one image detection signal and according to a registration model to thereby generate at least one fused image reference;
   comparing at least one said fused image reference to at least one validated object template that has been selected from a stored plurality of validated object templates;
   if at least one said validated object template is determined to sufficiently match at least one said fused image reference, classifying at least one said object according to the at least one matching validated object template;
   if no said validated object template is determined to sufficiently match at least one said fused image reference, generating at least one candidate object template according to at least one said fused image reference, scoring at least one said candidate object template, validating at least one said candidate object template according to said scoring, and classifying at least one said object according to at least one validated candidate object template; and
   performing a countermeasure according to the classification of at least one said object.

20. A method as in claim 19, said method further comprising the steps of:
   detecting a first object and generating a first object detection signal;
   generating a first candidate object template in response to said first object detection signal;
   detecting a second object and generating a second object detection signal; and
   classifying said second object in response to said first candidate object template.

* * * * *